United States Patent Office
3,687,725
Patented Aug. 29, 1972

3,687,725

MAGNETIC RECORDING MEDIA

Job-Werner Hartmann, 1 Frankenstrasse, 6700 Ludwigshafen, Germany; Hans Joerg Hartmann, 12 Im Sandgarten, 6706 Wachenheim, Germany; Georg Schnell, 21 Freinsheimer Str., 6700 Ludwigshafen, Germany; and Roland Falk, 3 Vogesenstrasse, and Werner Balz, 4 Strassburger Str., both of 7601 Willstaett, Germany No Drawing. Filed June 5, 1970, Ser. No. 43,924
Claims priority, application Germany, June 9, 1969, P 19 29 171.5
Int. Cl. H01f *10/02*
U.S. Cl. 117—235 8 Claims

ABSTRACT OF THE DISCLOSURE

Magnetic recording media comprising a non-magnetic support and a magnetic layer based on magnetic pigment and binder, wherein the magnetic layer contains a mixture of a non-magnetizable powder of a silicate having sheet structure (Mohs' hardness less than 6), e.g. talc, and a non-magnetizable powder with cube-shaped to spherical particles of hard oxides, carbides or nitrides of aluminum, boron, silicon and/or chromium, e.g. corundum.

This invention relates to magnetic recording media in which firmly adhering magnetic layers consisting essentially of magnetic powder, binder and auxiliaries are applied to a non-magnetic support. Such magnetic recording media are used in rigid or flexible form for recording acoustic, visual and digital signals, information and the like.

As is well known, magnetic recording media are passed over magnetic heads of different, usually metallic, materials for recording or playing back, mechanical contact occurring between the magnetic layer and head material.

An important problem is the interaction of the magnetic layer and magnetic head. It has for a long time been the aim to develop magnetic layers having outstanding abrasion resistance in order to prevent the formation of deposits of material from the magnetic layer on the head, which deposits may easily result in recording errors. It is known to use very hard pulverulent materials to reduce the formation of such deposits, but this has the disadvantage that head wear is unduly high. Since magnetic heads are very expensive owing to their complex design, magnetic recording media should therefore cause as little wear to the heads as possible.

It is an object of the invention to provide a magnetic recording medium which does not cause deposits on the recording and reproducing heads or a measurable increase in head wear.

We have found that, surprisingly, magnetic recording media comprising a non-magnetic support and at least one firmly adhering magnetic layer based on magnetic pigment and binder, with or without the addition of auxiliaries, virtually eliminate the formation of deposits on the magnetic heads and head wear when the magnetic layer additionally contains, finely dispersed therein, a mixture of (a) a non-magnetizable powder based on a silicate having sheet structure and a Mohs' hardness of less than 6, and
(b) a non-magnetizable powder having cube-shaped to spherical particles of oxides, carbides or nitrides of aluminum, boron, silicon and/or chromium in amounts of 15 to 90% by weight of (a) and of 10 to 85% by weight of (b).

Particulate rod- or cube-shaped gamma-iron(III), particularly gamma-iron(III)oxide having an average particle size of 0.1 to 2$\mu$, is preferred as magnetic pigment Moreover, conventional particulate alloys of heavy metals, particularly of iron, cobalt and/or nickel or, alternatively, the equally well-known ferromagnetic chromium dioxide, may be used for this purpose. In the preparation of the magnetic pigment dispersion 20 to 140, in particular 100 to 130, parts by weight of the binder or binder mixture are usually used per approximately 100 to 130 parts by weight of magnetic pigment if the magnetic dispersion is to be used for the production of rigid magnetic recording media which will move at a high speed in relation to the head. In the production of flexible magnetic recording media 25 to 60 parts by weight of the binder or binder mixture are preferred for the stated amount of magnetic pigment.

According to the invention the magnetic layer or, in the case of multilayer magnetic recording media, at least and preferably the uppermost magnetic layer additionally contains, finely dispersed therein, a mixture of (a) a non-magnetizable powder based on a silicate having sheet structure and a Mohs' hardness of less than 6, preferably less than 5, and
(b) a non-magnetizable powder having cube-shaped to spherical particles of oxides, carbides or nitrides of aluminum, boron, silicon and/or chromium.

Particularly suitable non-magnetizable silicates (a) having sheet structure are those whose particles in two dimensions are on an average not larger than 2$\mu$, preferably from about 1 to 4$\mu$, and in the third dimension on an average not larger than 1$\mu$, preferably from about 0.02 to 0.5$\mu$. Examples of suitable silicates (a) are talc, montmorillonite and kaolinite or mixtures thereof; kaolinite is very suitable. Reaction products of materials, i.e. silicates, having the same structure and whose surface has been modified by chemical reaction may also be used.

Very suitable non-magnetizable powders (b) having cube-shaped to spherical particles of oxides, carbides or nitrides of aluminum, boron, silicon and/or chromium are those whose average particle size is from 0.3 to 10$\mu$, particularly from 0.5 to 7$\mu$. Examples of suitable powders are silicon dioxide powder, quartz powder, aluminum oxide powder, fused alumina, silicon carbide, boron carbide and chromium(III)oxide powder. Silicon carbide, boron carbide and very hard oxides of silicon, aluminum or chromium which are suitable as abrasives are particularly suitable. Preferred powders have a Mohs' hardness of more than 7.

Powders (a) and (b) may be used in amounts of 15 to 90% by weight and 10 to 85% by weight respectively, based on the mixture of (a) and (b). A mixture of for example 24 to 31% by weight of (a) and 69 to 76% by weight of (b) has proved to be very suitable. An intimate mixture of (a) and (b) has proved to be advantageous. Silicic powders which, by virtue of their origin or method of manufacture, structurally combine the particles (a) and (b) may also be used. A mixture of (a) and (b) having the structure of a loose layered arrangement and a density according to German standard specification No. 53,193 of from about 2.5 to 2.7, the particles (b) being preferably situated between the silicates (a) having sheet structure, is favorable.

The particulate, non-magnetizable solids mixture used according to this invention is advantageously added to the magnetic layer or, in the case of magnetic recording media having more than one magnetic layer, to at least the uppermost magnetic layer during its preparation in amounts of from 2 to 16%, particularly 4 to 7%, by weight based on the amount of magnetic powder used.

The binders used for the dispersion of the particulate magnetic pigment and the particulate solid material also employed in accordance with the present invention may be any of the binders conventionally used in the manufacture of magnetic layers. Thus, copolymers derived from predominant amounts of vinyl chloride or vinylidene chloride with comonomers such as vinyl esters or acrylic esters, e.g. vinyl acetate, ethyl acrylate, ethyl methacrylate, butyl acrylate or butyl methacrylate, are suitable, as are also synthetic polyamides having amide groups as recurring units in the main chain of the molecule, mixtures of polyisocyanates and fairly high molecular weight hydroxyl compounds, and combinations of butylated melamine-formaldehyde precondensates with polyvinylbutylral resin. Very suitable are also combinations of optionally alcohol-etherified phenol-formaldehyde condensates with polyepoxide compounds, in particular polyglycidyl ethers of polyhydric hydroxyl compounds such as 2,2-bis(p-hydroxyphenyl)propane, glycerol, 1,4-butanediol or pentaerithritol. Curable copolymers of N-methylolacrylamide, N-methylolmethacrylamide or alcohol-etherified N-methylolacrylamide or N-methylolmethacrylamide are also very suitable. A very suitable binder for rigid magnetic recording media is for example a mixture of a curable copolymer (copolymer A) of 40 to 80% by weight of alkenylbenzolic hydrocarbons having 8 to 10 carbon atoms, if desired up to 55% by weight of esters of acrylic and/or methacrylic acid with alkanols having 1 to 8 carbon atoms, 5 to 40% by weight of alcohol-etherified N-methylolamides of acrylic and/or methacrylic acid, up to 15% by weight of olefinically unsaturated carboxylic acids having 3 to 5 carbon atoms and/or up to 20% by weight of unsaturated monomers having one alcoholic hydroxyl group, such as monoesters of aliphatic diols or polyols having 2 to 8 carbon atoms with olefinically unsaturated carboxylic acids having 3 to 5 carbon atoms, and if desired up to 30% by weight of another copolymerizable monoolefinically unsaturated monomer and 0.1 to 30% by weight, based on the copolymer A, of polyvinyl methylether and/or a curable polyepoxide compound, in particular a polyglycidyl ether. Suitable binders of flexible magnetic recording media are polymers or copolymers of vinyl chloride, vinyl acetate, acrylonitrile, vinylidene chloride, acrylic or methacrylic esters, etc., as well as polyamides, polyurethanes and mixtures of such materials.

To prepare the dispersion of the magnetic pigment or magnetic powder and, if desired, the particulate solid materials coemployed according to the invention, the pigments are advantageously dispersed in the binder used and sufficient solvent by a conventional process, for example in a ball mill. Suitable organic solvents for the production of the dispersions are aromatic hydrocarbons, such as benzene, toluene or xylene; glycol ethers, such as ethyl glycol; glycol ethyl esters, such as ethylglycol acetate; alcohols, such as propanol or butanol; ketones, such as acetone or methylethyl ketone; ethers, such as tetrahydrofuran; and mixtures thereof, and other solvents and solvent mixtures commonly used for binders for surface coatings. The binder may be dissolved in the solvents and the magnetic pigment predispersed in this solution. Alternatively, the binder, magnetic pigment and solvent may be mixed together in the dispersing apparatus. Further binders can be added to this mixture either in the solid state or in the form of 20 to 60% solutions. We have found it advantageous to continue dispersion until an extremely fine distribution of the pigments has been achieved, which may take 1 to 4 days. This is followed by repeated filtration to give a completely homogeneous magnetic dispersion.

The particulate non-magnetic solid materials coemployed according to this invention may be added to the magnetic dispersion at the beginning of its preparation. It is however also possible to produce a ground paste of particulate non-magnetic solids, binder and solvent in separate dispersing equipment, which paste is mixed into the magnetic dispersion before it is applied to the base material. This procedure is advantageous when particles having a diameter of more than 4$\mu$ are present in the solids mixture.

The application of the dispersion to the non-magnetic support in the form of a layer must be effected in a conventional manner. Conventional non-magnetic flexible and rigid supports, e.g. films or tapes based on polyvinyl chloride or linear polyesters, such as polyethylene terephthalate film of the usual thickness, and discs of other non-magnetic materials, particularly non-magnetic metals, can be used. The process of the invention has proved to be particularly suitable for the manufacture of magnetic discs using metal discs, particularly aluminum discs, as supports, Layers of the dispersion may be advantageously applied to metal discs or drums by the centrifugal casting process described in U.S. patent specification No. 2,913,-246. In this method the magnetic dispersion is kept in motion by recirculating apparatus, further filtration being simultaneously carried out. The mixture is then poured onto the slowly rotating discs from a movable arm. By increasing the speed to about 600 to 1,000 revolutions per minute the excess magnetic dispersion is thrown off and a uniform layer of the dispersion is produced on the disc. The other side of the disc is then coated in the same way.

The applied layers are then dried by heating and, if a curable binder has been used, cured by heating advantageously at about 120° to 230° C. for 30 to 60 minutes. The curing time may be shortened and the curing temperature lowered for some binding agents by including conventional during catalysts, such as acids, e.g. phosphoric acid or hexahydrophthalic acid. The surface is then usually finished by a conventional polishing method.

The magnetic recording media according to this invention are distinguished by much improved wear properties while practically avoiding the formation of deposits on the magnetic heads. The very slight degree of head wear is also particularly advantageous. It is surprising that a combination of the advantageous properties of the magnetic recording media can be achieved without the recording sensitivity, such as the signal-to-noise ratio, frequency response and other electromagnetic properties which are of importance for magnetic recording media, being impaired.

The invention is further illustrated by the following examples in which parts and percentages are by weight unless otherwise stated.

EXAMPLE 1 AND COMPARATIVE EXPERIMENTS A TO C 3,000 parts of acicular gamma-iron(III) oxide (particle size less than 0.6$\mu$), 2,300 parts of tetrahydrofuran, 2,200 parts of toluene, 60 parts of an ethoxylated oleic ethanolamide, 280 parts of a commercially available vinyl chloride/ethyl maleate copolymer, 100 parts of a butanediol-1,4/adipic acid polyester are mixed and divided into four portions, 300 parts of a paste of 70% of tetrahydrofuran, 30% of toluene, 15% of the said vinyl chloride/ethyl maleate copolymer and 15% of particulate solids of various kinds is added to each portion; the solids used are given below:

Example 1:
12% of microtalc (mean particle size 4$\mu$) and
3% of fused alumina (mean particle size 5$\mu$).

Comparative Experiment

A: 15% of gamma-iron(III)oxide.
B: 15% of chromium(III)oxide $Cr_2O_3$ (mean particle size 1.5μ).
C: 15% of microtalc (mean particle size 4μ).

Each portion to which a different paste has been added is dispersed in a ball mill for 36 hours, and then 620 parts of the said vinyl chloride/ethyl maleate copolymer, 1,480 parts of toluene, 1,000 parts of tetrahydrofuran and 75 parts of isopropyl myristate are added.

Four different types of magnetic recording media are prepared in the same conventional manner, the four different mixtures being filtered and applied to polyethylene terephthalate films which are dried, calendered and finally cut into tapes ¼ inch in width. The results obtained with the recording media in identical tests are given in the following Table 1:

TABLE 1

| | | Comparative experiment | | |
|---|---|---|---|---|
| | Ex. 1 | A | B | C |
| 1. Head wear in mg./h. (wear on mu metal head replica caused by a 20-meter loop of tape travelling at 1 m./sec. | 0.01 | 0.02 | 0.20 | 0.02 |
| 2. Tape wear (magnetic layer against magnetic layer; 95-cm. loop; 38 cm./sec. tension 75 g.), reduction in level of a signal in db after 30 minutes | +0.4 | −2 | 0 | 0 |
| 3. Deposition on magnetic head of a commercial tape recorder in sustained operation (48 hours) using a 120-meter tape at 90% relative humidity | No | Yes | No | No |
| 4. Sensitivity, with reference to a commerical tape in db | +0.5 | +0.5 | 0 | −2 |
| 5. Frequency response in db | −1 | −1 | −1.5 | −1 |
| 6. Harmonic distortion in db | 39.5 | 39 | 38.5 | 32 |
| 7. Reference level-to-noise ratio in db | 64.5 | 65 | 64 | 64 |

It can be seen that, although disturbances due to deposits on the magnetic head are avoided by the addition of hard powder (abrasive, Experiment B), head wear is increased tenfold. The addition of silicic powder alone having sheet structure (Experiment C) prevents the formation of deposits on the magnetic head, but impairs the electromagnetic properties, cf. in particular 4 to 6.

EXAMPLE 2 AND COMPARATIVE EXPERIMENT D 900 parts of acicular gamma-iron(III)oxide (mean particle size less than 0.6μ), 850 parts of a mixture of equal parts of tetrahydrofuran and toluene, 18 parts of soya lecithin, 187.5 parts of a 40% solution of a copolymer A derived from 15 parts of butanediol-1-acrylate-4-acetate, 10 parts of N-butoxymethyl acrylamide, 73 parts of methyl methacrylate and 2 parts of acrylic acid in the above solvent mixture and 174 parts of a 43% solution of a copolymer B derived from 15 parts of butanediol-1-acrylate-4-acetate, 10 parts of N-butoxymethyl acrylamide, 40 parts of methyl methacrylate and 35 parts 2-ethylhexyl acrylate are dispersed for 40 hours in a ball mill containing 4,000 parts of steel balls 4 mm. in diameter and having a capacity of 6,000 parts by volume together with 44.5 parts of a mineral powder having a Mohs' hardness of 7 which according to mineralogical analysis is composed of 72% of $SiO_2$ and 28% of kaolinite and in which $SiO_2$ particles having rounded edges and a size of from about 0.5 to 1μ are situated between kaolinite leaflets about 0.02μ in thickness.

After dispersing for 40 hours, 200 parts of the above solvent mixture, 125 parts of the said solution of copolymer A and 233 parts of the said solution of copolymer B are added to the mill. After dispersing for a further 2 hours, the magnetic dispersion is filtered and applied to a 25μ polyethylene terephthalate film to give a dry coating 12μ in thickness.

The magnetic film is cut into tapes ¼ inch in width and tested as described in Example 1. The results are given in Table 2.

In a comparative experiment the procedure of Example 2 is followed except that no mineral powder ($SiO_2$/kaolinite) is used. The results obtained with the magnetic tape prepared with this dispersion are also given in Table 2 (Comparative Experiment D).

TABLE 2

| Test (cf. Example 1) | Ex. 2 | Comparative Experiment D |
|---|---|---|
| 1. Head wear | 0.06 | 0.08 |
| 2. Tape wear | −0.5 | −1.0 |
| 3. Deposition on magnetic head | No | Yes |
| 4. Sensitivity | −2.0 | −3.0 |
| 5. Frequency response | −1.5 | −2.5 |
| 6. Harmonic distortion | 32 | 31 |
| 7. Reference level-to-noise ratio | 70.5 | 69 |

EXAMPLES 3 TO 6 AND COMPARATIVE EXPERIMENT E 3,000 parts of acicular gamma-iron(III)oxide (particle size less than 0.6μ) is dispersed for four days in a ball mill half-filled with steel balls 5 mm. in diameter and having a capacity of 30,000 parts by volume together with 150 parts of carbon black, 150 parts of soya lecithin, 400 parts of a polyurethane prepared from butanediol-1,4, adipic acid and 4,4'-diisocyanatodiphenylmethane, and 4,800 parts of tetrahydrofuran.

A solution of 90 parts of commercial nitrocellulose (medium viscosity, ester-soluble) and 45 parts of the said polyurethane in 750 parts of tetrahydrofuran is added and the whole is dispersed for a further 2 hours. The resultant magnetic dispersion is divided into five portions.

Mixtures having the following compositions are prepared by milling for 2 hours in a ball mill:

Example 3:
- 15 parts of microtalc (mean particle size 4μ);
- 15 parts of boron carbide powder (particle size 0.5 to 0.8μ);
- 30 parts of a copolymer of 60% vinyl chloride and 40% vinyl acetate; and
- 40 parts of tetrahydrofuran.

Example 4:
- 10 parts of extremely finely ground kaolinite (passes a 10μ sieve);
- 25 parts of quartz powder (particle size less than 7μ);
- 30 parts of the said vinyl chloride copolymer;
- 1 part of soya lecithin; and
- 40 parts of tetrahydrofuran.

Example 5:
- 18 parts of extremely finely ground kaolinite (passes a 10μ sieve);
- 12 parts of silicon carbide powder (mean particle size 6 to 7μ);
- 30 parts of the said vinyl chloride copolymer; and
- 40 parts of tetrahydrofuran.

Example 6:
- 20 parts of microtalc (mean particle size 4μ);
- 10 parts of chromium nitride powder;
- 30 parts of the said vinyl chloride copolymer; and
- 40 parts of tetrahydrofuran.

Comparative Experiment E:
- 30 parts of quartz powder (as specified in Example 4);
- 30 parts of the said vinyl chloride copolymer; and
- 40 parts of tetrahydrofuran.

Each of these pasty mixtures is mixed with a portion of the above magnetic dispersion; in the case of Examples 3 to 6, 5 parts of non-magnetic powder are present per 100 parts of magnetic powder.

The magnetic dispersions thus obtained are applied to 25μ polyethylene terephthalate film so that after drying at 60 to 90° C. magnetic coatings 11 to 13μ in thickness are obtained.

The magnetic films are cut and tested as described in Examples 1 and 2. The results of the tests are given in Table 3.

TABLE 3

| Test (cf. Example 1) | Examples 3 | 4 | 5 | 6 | Comparative Experiment E |
|---|---|---|---|---|---|
| 1. Head wear | 0.06 | 0.08 | 0.06 | 0.04 | 0.15 |
| 2. Tape wear | 0 | 0 | 0 | −1 | −2 |
| 3. Deposition on magnetic head | No | No | No | No | No |
| 4. Sensitivity | −0.5 | −1.0 | 0 | 0.5 | −1.5 |
| 5. Frequency response | −1 | −1 | −2.5 | −2 | −2 |
| 6. Harmonic distortion | 37 | 36.5 | 37.5 | 35 | 35.5 |
| 7. Reference level-to-noise ratio | 62 | 62.5 | 63 | 62.5 | 62.5 |

We claim:

1. A magnetic recording medium comprising a non-magnetic support and at least one firmly adhering magnetic layer based on magnetic pigment and binder, wherein the magnetic layer contains, finely dispersed therein, an intimate mixture of (a) a non-magnetizable powder based on a silicate having sheet structure and a Mohs' hardness of less than 6, said silicate particles having two dimensions on an average not larger than 8μ and a third dimension on an average not larger than 1μ and (b) a non-magnetizable powder having cube-shaped to spherical particles of oxides, carbides or nitrides of aluminum, boron, silicon or chromium, said particles having a Mohs' hardness greater than 7 and a particle size of 0.5 to 7μ in amounts of 24 to 31% by weight of (a) and of 69 to 76% by weight of (b).

2. A magnetic recording medium as claimed in claim 1, wherein the mixture of (a) and (b) is used in amounts of from 2 to 16% by weight based on the amount of magnetic pigment.

3. A magnetic recording medium as claimed in claim 1, wherein the magnetic layer additionally contains, finely dispersed therein, a mixture of (a) a non-magnetizablie powder based on a silicate having sheet structure and a Mohs' hardness of less than 5, and (b) a non-magnetizable powder having cube-shaped to spherical particles of oxides, carbides or nitrides of aluminum, boron, silicon or chromium having a Mohs' hardness of greater than 7.

4. A magnetic recording medium as claimed in claim 1, wherein the added mixture contains, as non-magnetizable powder (b), cube-shaped to spherical particles of silicon oxide, aluminum oxide, silicon carbide or chromium (III) oxide.

5. A magnetic recording medium as claimed in claim 1, wherein the added mixture contains boron carbide as non-magnetizable powder (b).

6. A magnetic recording medium as claimed in claim 1, wherein the added mixture contains chromium nitride as non-magnetizable powder (b).

7. A magnetic recording medium as claimed in claim 1, wherein the added mixture contains talc or kaolinite as non-magnetizable powder based on a silicate (a).

8. A magnetic recording medium as claimed in claim 1, wherein the added mixture is a mineral powder consisting of a loose layered arrangement of 69 to 76% by weight of silicon dioxide particles having rounded edges and a size of from about 0.5 to 7μ and 24 to 31% by weight of kaolinite leaflets 0.02 to 0.5μ in thickness and less than 8μ in length and width, the silicon dioxide particles being located between the kaolinite leaflets.

References Cited

UNITED STATES PATENTS 3,007,807 11/1961 Radocy ............ 117—235
3,470,021 9/1969 Hendricx et al. .... 117—235 X

FOREIGN PATENTS 1,145,349 3/1969 Great Britain.

OTHER REFERENCES

Friedman et al.: December 1966, IBM Tech. Dis. Bull., vol. 9, No. 7.

WILLIAM D. MARTIN, Primary Examiner

B. D. PIANALTO, Assistant Examiner

U.S. Cl. X.R.

117—237; 252—62.54

PO-1050
(5/69)

UNITED STATES PATENT OFFICE
CERTIFICATE OF CORRECTION

Patent No. 3,687,725 Dated August 29, 1972

Inventor(s) Hans Joerg Hartmann et al

It is certified that error appears in the above-identified patent and that said Letters Patent are hereby corrected as shown below:

Column 1, after line 8 insert -- assignors to Badische- Anilin- &Soda- Fabrik Aktiengesellschaft --

Signed and sealed this 24th day of April 1973.

(SEAL)
Attest:

EDWARD M.FLETCHER,JR.
Attesting Officer

ROBERT GOTTSCHALK
Commissioner of Patents